United States Patent [19]

Sudrabin et al.

[11] Patent Number: 4,885,880

[45] Date of Patent: Dec. 12, 1989

[54] CORROSION INHIBITING SECONDARY BARRIER SYSTEM FOR UNDERGROUND STORAGE TANKS

[75] Inventors: David A. Sudrabin; Klaus Grunau, both of Hendersonville, N.C.

[73] Assignee: Fibrestone Inc., Ft. Myers, Fla.

[21] Appl. No.: 95,011

[22] Filed: Sep. 8, 1987

[51] Int. Cl.[4] ........................ G01M 3/04; B65D 25/18

[52] U.S. Cl. .................................. 52/169.6; 220/453; 220/457

[58] Field of Search ................. 52/169.6, 20; 220/426, 220/496, 1 B, 5 A, 445, 453, 457, 425, 466, 459, 901

[56] References Cited

U.S. PATENT DOCUMENTS

| | | | |
|---|---|---|---|
| 2,777,295 | 1/1957 | Bliss | 220/1 B |
| 3,383,004 | 5/1968 | Closner | 220/5 A |
| 3,700,512 | 10/1972 | Pearson | 220/5 A |
| 3,848,765 | 11/1974 | Durkop | 220/469 |
| 3,852,973 | 12/1974 | Marothy | 220/445 |
| 3,935,957 | 2/1976 | Hasegawa | 220/426 |
| 4,003,173 | 1/1977 | Foley | 220/1 B |
| 4,128,187 | 12/1978 | Okamoto | 220/901 |
| 4,412,561 | 11/1983 | Sakaguchi | 138/153 |
| 4,561,292 | 12/1985 | Pugnale | 220/426 |
| 4,623,435 | 11/1986 | Nebgen | 204/197 |
| 4,626,330 | 12/1986 | Farmer | 204/197 |
| 4,651,893 | 3/1987 | Mooney | 220/496 |
| 4,653,312 | 3/1987 | Sharp | 220/469 |
| 4,676,093 | 6/1987 | Pugnale | 220/426 |
| 4,685,327 | 8/1987 | Sharp | 220/469 |

OTHER PUBLICATIONS

Fiber Reinforced Concrete, SP-44, by American Concrete Institute, 1973, pp. 175-181.

Fiber Cements and Fiber Concretes, by Hannant, published John Wiley & Sons, pp. 545 & 548, & 549.

*Primary Examiner*—John E. Murtagh
*Attorney, Agent, or Firm*—Alfred E. Wilson

[57] ABSTRACT

Large capacity truck tankers periodically replenish the petroleum and other products in the underground storage tanks. These underground storage tanks corrode, and develop leaks releasing their petroleum products into the ground. As a result potable water supplies are contaminated, and the petroleum products remain in the ground for long periods of time. Fiberglass plastic tanks were developed to replace the metal tanks which corroded. If a sharp object such as a stone contacted the fiberglass tank, the recurring filling of the tank caused a slight degree of movement or working of the tank which in time resulted in the tank leaking. To overcome this problem, it has been determined that a containment vessel or barrier should surround the primary tank and that the space between the tank and the barrier should be inspected periodically to determine if leakage has occurred. If leakage occurs the tank and the barrier must be removed and replaced. We have devised a system that overcomes these difficulties by wrapping the tank, whether made of metal or fiberglass, with a heavy blanket of a thin, relatively stiff, loosely woven material such as nylon or polypropylene which is impervious to petroleum products. We wrap the entire tank in a thick matted blanket of this material that ranges, for example, from approximately a half inch to an inch and a half or more thick. We secure a suitable backing material such as cloth that is compatible with cement about the loosely woven barrier material. We then apply a cocoon of sprayed Glass Fibre Reinforced Cement (G.F.R.C.) or cement having other fibre reinforcement.

3 Claims, 2 Drawing Sheets

CORROSION INHIBITING SECONDARY BARRIER SYSTEM FOR UNDERGROUND STORAGE TANKS

BACKGROUND OF THE INVENTION

It has been determined that underground metal storage tanks for petroleum products and the many chemicals that are dispensed from tanks that are buried in the ground are relatively short lived. It has been found that due to corrosion and other causes, metal tanks develop leaks after approximately ten years.

When petroleum products leak into the ground they contaminate the potable water supply over an extensive area, and they linger in the ground for a long period of time. Petroleum products are also suspected of contributing to the development of cancer.

Recent legislation has been passed in several states requiring the owners of tanks that leak to report them, and to remove them promptly, and to dig out any earth that has become contaminated. In many instances some form of a barrier is now being required to surround the tank to contain leakage from the tank, and prevent disbursement of the tank contents into the soil or water table. In addition the owners are subjected to very heavy fines if they fail to report a leak promptly and to correct it quickly. In most instances it has been determined that the failure of a buried underground tank occurs due to corrosion from the outside, where the tank is in contact with the ground or water table.

FIELD OF THE INVENTION

In view of the substantial dangers that are involved resulting from leaky metal underground gasoline storage tanks and tanks for other chemicals, it is now mandatory in many states that the problem be corrected promptly after a leak is discovered. These dangers with metal tanks lead to the development of the plastic fiberglass tank, but even they have not proven to be completely satisfactory.

DESCRIPTION OF THE PRIOR ART

Heretofore storage tanks for petroleum products and other chemicals have been installed underground, and very little if any attention was paid to the tanks. As a result in many instances the metal tanks started to leak after approximately ten years or so due primarily to corrosion which would deteriorate the tank, resulting in penetration of the tank causing leakage of its contents.

Where the fiberglass plastic tanks were sued the slight movement of the tank against a stone or other object in time would produce a hole in the tank. Frequently the first notice that a tank was leaking resulted when someone in the neighborhood complained that their potable water was contaminated and smelled bad. Efforts to locate the cause of the bad smelling water frequently lead to the nearby leaky underground fuel storage tank. Insofar as is known no one has succeeded completely in solving these increasingly serious problems.

SUMMARY OF THE INVENTION

We have devised a complete corrosion inhibiting containment secondary barrier that can be applied to metal tanks, and also to fiberglass plastic tanks that are used to store petroleum and other products underground.

We wrap the complete tank in a relatively thick blanket of matted material such as nylon or polypropylene materials which are substantially impervious to petroleum products. If desired the support for the primary tank can be a corrugated or otherwise contoured member having spaced support fingers. We then place a covering of a fine cloth like material that is compatable with cement, over the blanket or support member, and we then spray or otherwise apply a Fibrestone cocoon of Glass Fibre Reinforced Cement (G.F.R.C.) over the cloth or other covering of the blanket. This results in the tank being completely enclosed within the G.F.R.C. cocoon. The tank is thus enclosed within the resilient plastic material, and that in turn is enclosed within the G.F.R.C. barrier which is strong and is impervious to the product contained within the primary tank.

DESCRIPTION OF THE PREFERRED MODEL

Figure 1:
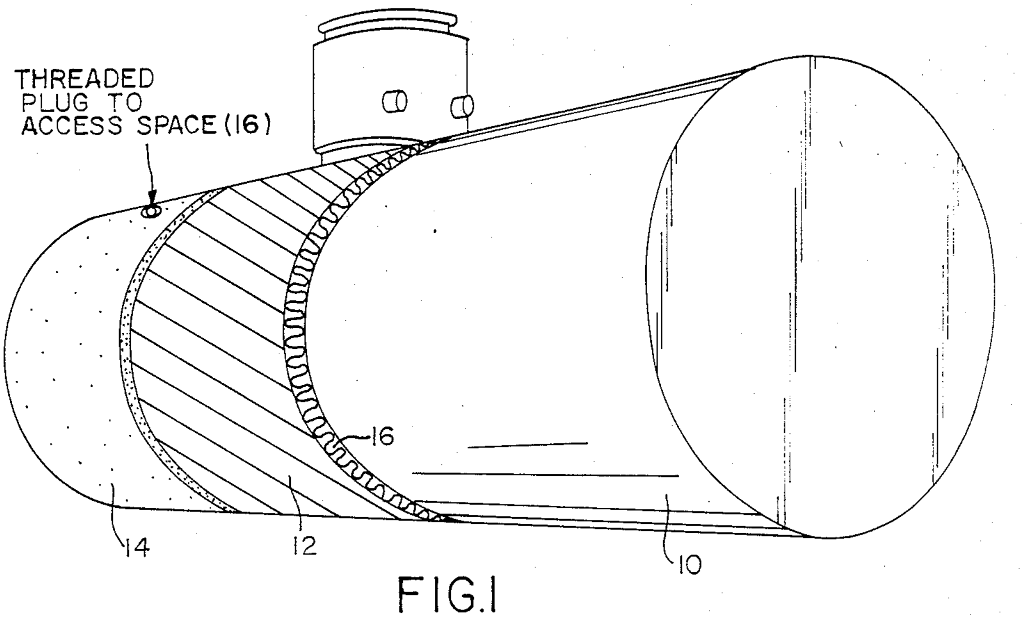
FIG. 1 is a perspective view of a primary tank which may be formed of metal or fiberglass plastic material having a supporting resilient spacer surrounding the tank, and a Fibrestone G.F.R.C. barrier cocoon surrounding the tank and the supporting spacer.

The laws of many states now require that petroleum underground storage tanks must have some form of dual containment or barrier structure to prevent leakage from the tank escaping to the ground area in which the tank is buried. We have succeeded in providing a barrier structure which can be applied directly to any tank, regardless of the size of the tank, and applicable to tanks made of steel or to the fiberglass plastic tanks, or to tanks formed of any other materials.

In our system the primary petroleum supply tank 10 is wrapped in a bed of resilient plastic material 12 such as nylon, polypropylene or other material which is impervious to petroleum products, and which is wrapped completely about the tank to provide a resilient support for the tank. The tank 10 and the resilient support 12 for the tank 10 as thus provided is then encased in a cocoon or barrier 14 of Fibrestone G.F.R.C. which provides a sturdy and strong enclosure or barrier for the tank 10 and its supporting resilient material 12.

It will be thus apparent that we have wrapped the entire tank 10, including its ends in a bed of woven plastic material 12 or other supporting material that does not deteriorate in the presence of petroleum products or chemicals contained by the primary tank 10. The resilient material 12 that is wrapped about the tank is approximately one half inch to an inch and a half or more in thickness. This material is quite resistant to bending and will support the weight of the tank, when the tank is completely filled with petroleum or other products so that the tank is suspended within and is separated from the G.F.R.C. cocoon or barrier, and does not touch the cocoon or barrier at any place, even when the tank is completely full of fuel or whatever the tank holds.

We apply a thin sheet of cloth 11 or other material that is compatable with cement to the bed of resilient material, and then wrap the sheet of cloth 11 and the supporting resilient material 12 about the entire tank 10 with the surfaces of the resilient material coming in contact with the outer surface of the tank 10 throughout and with the cloth 11 or other material that is compatable with cement being on the outside over the resilient material 12.

We then apply the barrier or cocoon of Glass Fibre Reinforced Cement (G.F.R.C.) 14 over the entire tank, preferably by spraying. The sprayed G.F.R.C. contacts the thin sheet of relatively absorbent cloth or other material that surrounds the resilient material and forms a firm bond therewith, thereby forming a solid bond with the exterior of the resilient tank supporting material. This is achieved because the G.F.R.C. being relatively fluid or expressed as having a high slump, penetrates or seeps through the cloth backing and forms a firm bond therewith. When the G.F.R.C. is solidified or cured it provides the fluid tight cocoon or barrier 14 surrounding the entire surface of the tank and the resilient material 12 surrounding the tank. The resilient material 12 separates the tank 10 from the outer G.F.R.C. barrier or cocoon 14 and effectively provides a secondary air filled barrier surrounding the primary tank 10 which holds the petroleum or other product. If the inner or primary tank 10 should develop a leak the Fibrestone barrier or cocoon 14 will trap and contain the petroleum or other product escaping from the primary tank 10 and prevent is from getting to the adjacent ground surrounding the tank.

Figure 3:
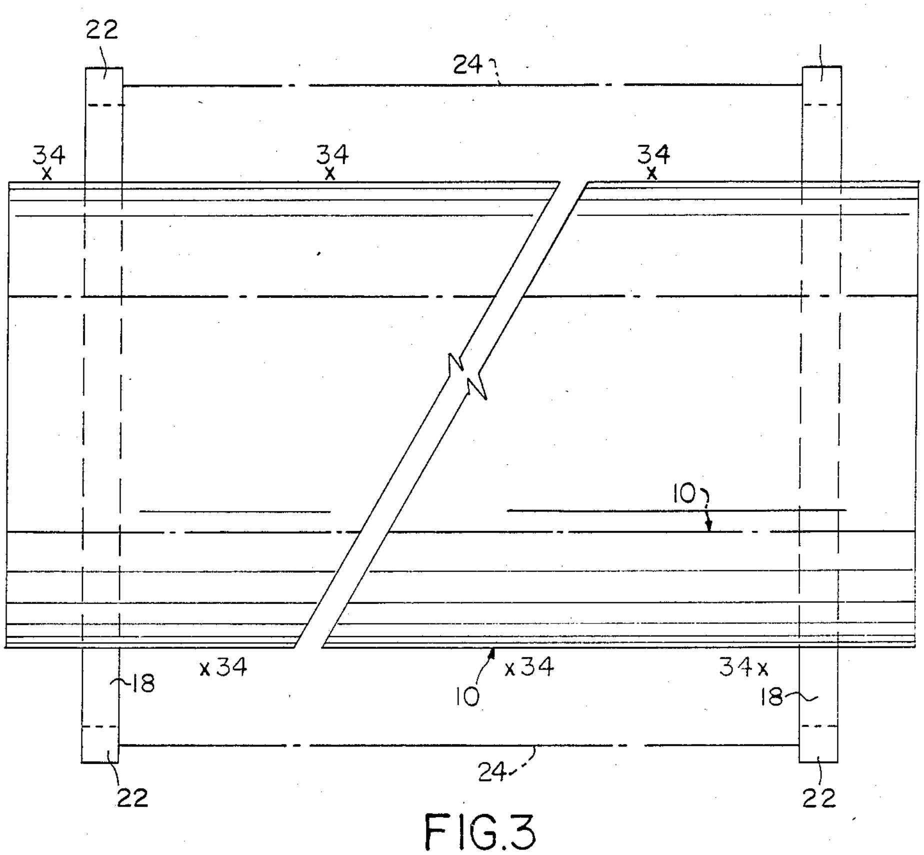
FIGS. 3 and 4 are plan and sectional views of the tank supporting and rotating mechanism for applying the G.F.R.C. cocoon to the tank.
Figure 4:
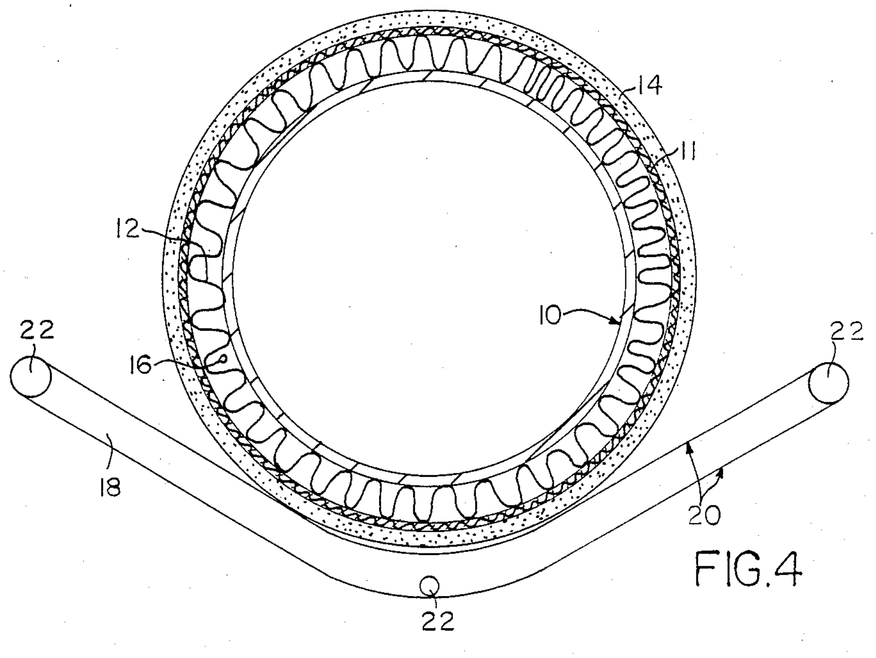

To facilitate the application of the cocoon or barrier 14 to the tank 10, the tank with the blanket of resilient material 12 surrounding and contacting the entire surface of the tank 10 is positioned in slings 18 as shown in FIGS. 3 and 4, and consisting of a plurality of spaced belts 20 which support the tank. The number of slings 18 or spaced belts 20 can be determined by the size and weight of the tank. The heavier the tank the greater the number of slings 18 or longitudinally spaced belts 20 that would be employed. If desired a smaller number of wider belts may be employed to keep the unit loading such that the plastic material is not crushed. The number of belts 20 employed and the width of those belts will be such that the tank 10 will at all times be spaced from the outer periphery of the resilient material 12.

The Glass Fibre Reinforced Cement is then sprayed on the outer surface of the cloth covered resilient material, it being noted that the resilient material 12 provides a separation at all times of the primary tank 10 and the cocoon or barrier 14. As the G.F.R.C. material is sprayed on the outer surface the tank is rotated slowly by the rotation of the small driving wheels 22 interconnected by a shaft 24. The G.F.R.C. material can be applied by hand held guns or by automatically shifted spray guns. The cocoon or barrier 14 is sprayed to a sufficient thickness that when it is dried a hard solid glass fiber reinforced cocoon or shell barrier is provided which can be buried in the ground with no danger of the primary tank 10 contacting the cocoon or barrier 14 even when the primary tank is fully loaded with product.

CATHODIC PROTECTION

Attention is directed to the fact that the barrier or cocoon 14 being formed of cement reinforced by glass fibers or other non-conducting reinforcing fibers or materials will not weaken or interfere with the protective cathodic protection current flow from anode ground beds 34 placed outside the secondary barrier. Where metal reinforcing bars and metal screen is used to strengthen or stabilize the concrete, these materials will have the tendency to reduce the effective distribution of protective current to the surface of the structure being protected, particularly if grounded to the primary structure. It is thus apparent that we can effectively apply both galvanic and impressed current cathodic protection systems by ideally locating the anodes to provide proper current distribution to the structure being protected without the interference of a conducting element between the structure and the anode.

If an electrolyte such as water is present in the space occupied by the material 12 between the primary tank 10 and the secondary Fibrestone cocoon or barrier 14, then Cathodic protection is effective to protect the primary tank 10 because the water between the inner primary tank 10 and the G.F.R.C. cocoon 14 completes an electrical circuit from the anode to the inner primary tank 10, and the inner tank is thus protected from corrosion which eventually would have caused leakage of the metal tank because the protective current will seek out the area of greatest potential (voltage) difference and not be attenuated or screened by an interfering metallic conductor.

If the primary tank 10 should leak petroleum products into the space 16 occupied by the material 12 between the primary tank 10 and the outer or G.F.R.C. barrier or cocoon 14 no corrosion would occur because the petroleum products are not electrically conductive, and do not conduct electricity as water does, thus preventing galvanic corrosion of the primary tank 10.

We thus have a Cathodic protection system that is operative regardless of what liquid gets into the space 16. Thus if the inner tank 10 should leak petroleum products into the space 16 between the metal tank 10 and the G.F.R.C. barrier 14 no corrosion would result because the petroleum products are not conductive of electricity, and hence no corrosion would result. If however the outer barrier or cocoon 14 should be punctured and water from the ground entered the space 16 between the inner primary tank 10 and the outer G.F.R.C. barrier or cocoon 14, the water being conductive of electricity would render the Cathodic protection effective.

With this system the use of the G.F.R.C. in the formation of the cocoon 14 provides an important breakthrough because the glass fibre or other material used to reinforce the concrete is not conductive of electricity as is concrete wherein metallic members are used to reinforce the concrete, and therefore will not reduce the effectiveness of the Cathodic protection.

Figure 2:
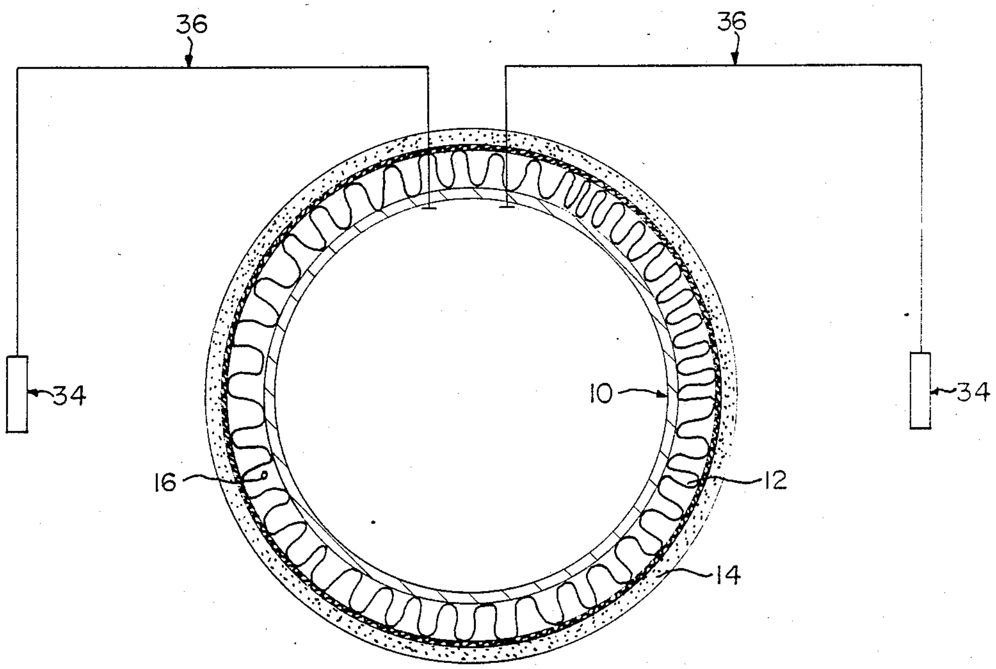
FIG. 2 is a sectional view taken substantially on the line 2—2 of FIG. 1 looking in the direction of the arrow.

Referring to FIG. 2 it will be noted that the primary tank 10 is illustrated as being contacted by and enclosed within the material 12. The cocoon or barrier 14 encases the material 12, the space 16 occupied by the resilient material 12 keeps the primary tank 10 from contacting the cocoon or barrier 14.

To enable the operator to determine if the contents of the tank 10 leaked into the space 16, or if ground water from the earth surrounding the tank assembly leaked into the space 16 through the cocoon or barrier 14, a removable and replacable valve 30 or threaded plug is provided adjacent the top 32 as the tank assembly will be installed in the ground. The tank assembly should be checked at regular intervals to determine if leakage has occured into the space 16 from the tank 10 or the ground in which the tank assembly is buried.

The primary tank 10 is provided with one or more anodes 34 electrically connected to the tank by electric leads 36 to render the Cathodic protection operative. Where large tanks 10 are involved it will be desirable to have several anodes 34 operative, such for example as one or two on each side and one at each end. It is desirable where this expedient is involved to have the leads 36 interconnected so as to render the Cathodic protection available and operative regardless of where a leak may occur.

We claim:

1. An underground storage tank system for liquids comprising an inner primary tank, a resilient spacer contacting and surrounding the primary tank and being formed of a material that is substantially impervious to the liquid being stored in the tank, a clothlike material wrapped about the resilient spacer and an outer barrier formed of high strength alkiline resistant glass fiber reinforced cement surrounding the resilient spacer, the resilient spacer being formed of a matted loosely formed relatively stiff material which holds the inner primary tank separated from the outer barrier so that the tank is suspended within the resilient spacer and is separated from the outer barrier and floats in the resilient spacer and does not touch the outer barrier even when the tank is completely full of liquid.

2. The method of protecting an underground storage tank for liquids which comprises the steps of forming a primary tank, positioning a resilient spacer formed of a material that is substantially impervious to the liquid to be stored in the tank, the resilient spacer contacting and surrounding the primary tank wrapping a clothlike material about the resilient spacer, forming an outer barrier formed of glass fiber reinforced cement surrounding the resilient spacer, the resilient spacer being formed of a matted loosely formed relatively stiff material which holds the tank separated from the outer barrier so that the tank is suspended within the resilient spacer and is separated from the outer barrier by the resilient spacer and floats within the resilient spacer and does not touch the barrier even when the tank is full of liquid.

3. The invention defined in claim 1 wherein the cocoon barrier is spray coated on the resilient spacer.

* * * * *